Sept. 29, 1970   E. WATSON   3,531,715
METHODS AND APPARATUS FOR EXAMINATION AND
MEASUREMENT BY MEANS OF NUCLEAR
MAGNETIC RESONANCE PHENOMENA
Original Filed Sept. 3, 1965   4 Sheets-Sheet 1
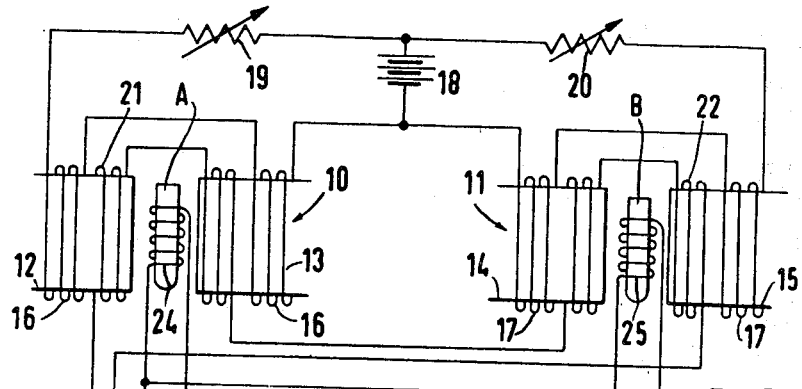
FIG.1.
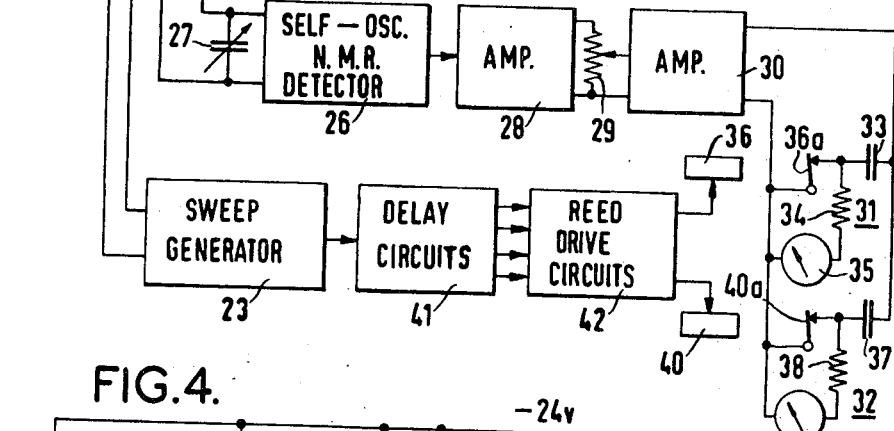
FIG.4.
FIG.2.
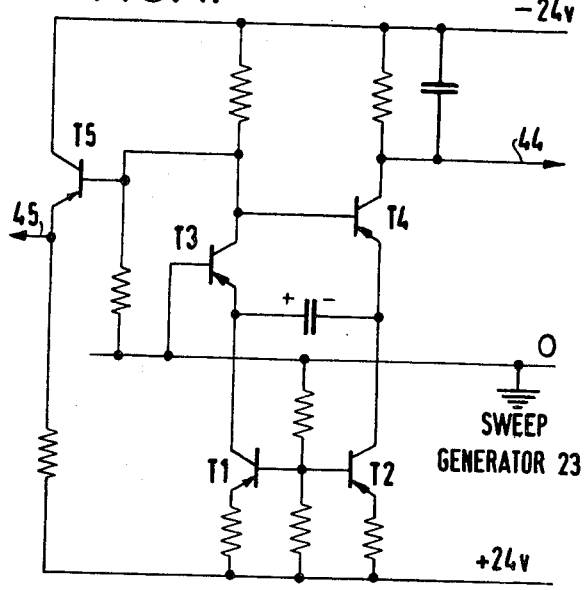
INVENTOR
EDWARD WATSON
BY Young & Thompson
Attys.

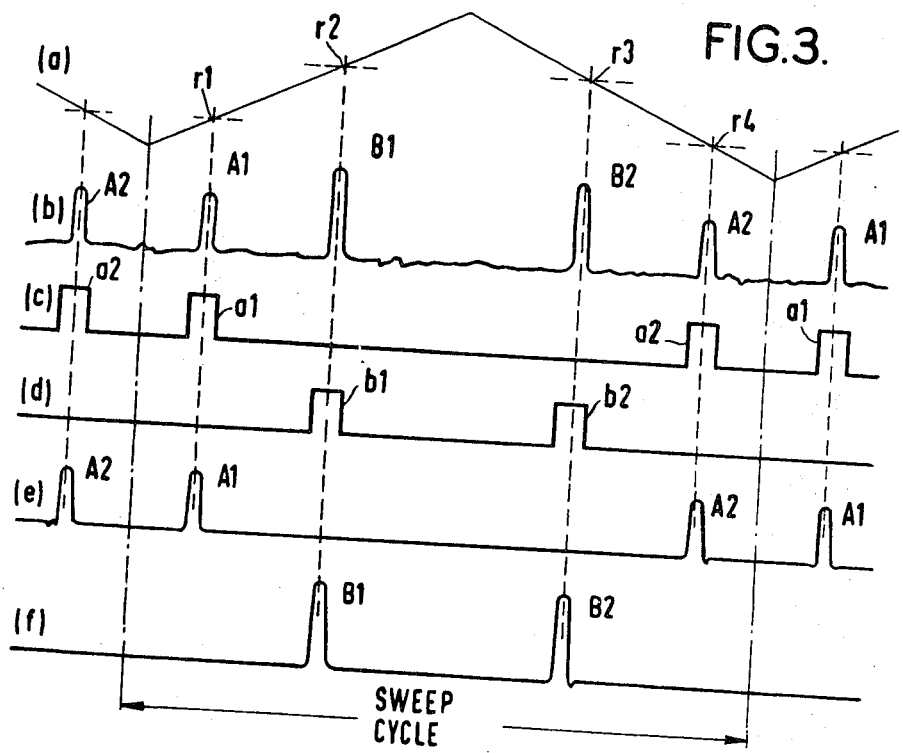
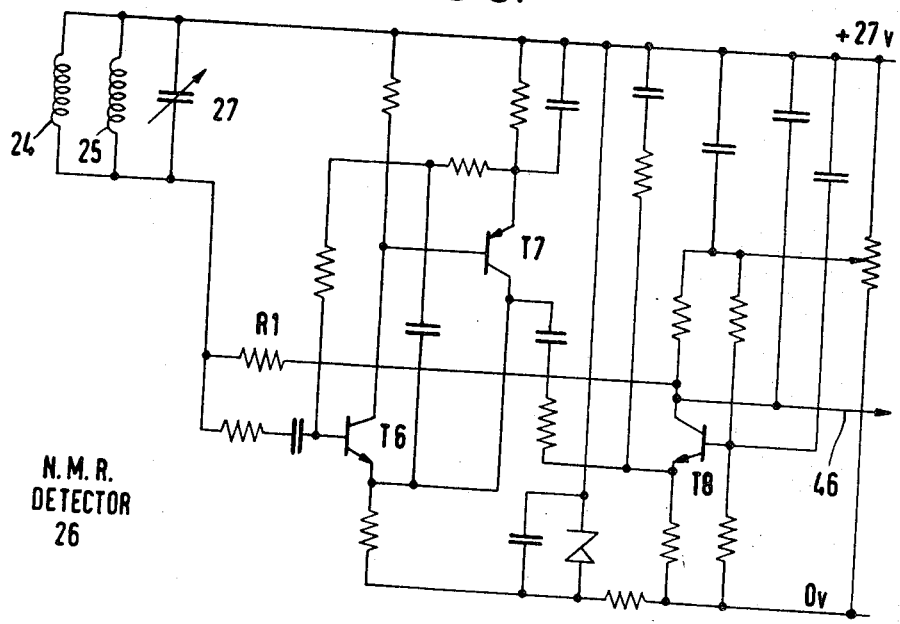

United States Patent Office 3,531,715
Patented Sept. 29, 1970

3,531,715
METHODS AND APPARATUS FOR EXAMINATION AND MEASUREMENT BY MEANS OF NUCLEAR MAGNETIC RESONANCE PHENOMENA
Edward Watson, Hampton, England, assignor to Newport Instruments Limited, Newport Pagnell, Buckinghamshire, England, a British company
Continuation of application Ser. No. 485,034, Sept. 3, 1965. This application Nov. 5, 1968, Ser. No. 774,588
Claims priority, application Great Britain, Sept. 7, 1964, 36,550/64
Int. Cl. G01n 27/78
U.S. Cl. 324—.5                                4 Claims

ABSTRACT OF THE DISCLOSURE

A signal including a plurality of successive and amplified nuclear magnetic resonance pulses obtained from a sample is gated to recording and/or display means only during separated short intervals of time which each embrace the period of occurrence of one of said pulses in order to remove unwanted noise. A measure of the area under said pulses is obtained and is free from any error due to amplifier drift. Two or more material samples, one of which is a comparison standard, may be used with an equivalent gating procedure.

---

This application is a continuation of copending application Ser. No. 485,034, filed Sept. 3, 1965, and now abandoned.

This invention relates to the use of the nuclear magnetic resonance phenomenon in the examination and measurement of the condition or properties of materials and has particular, although by no means exclusive, application to industrial use for the examination of, for instance, their moisture content. One particular application, quoted by way of example, is in the curing and storage of tobacco leaf. Other analogous applications are in the paper making, sugar, dried food, confectionery and flour milling industries and also with relation to pulverised coal and soil mechanics for civil engineering purposes.

The use of the nuclear magnetic resonance (n.m.r.) phenomenon for examination purposes is now well known and established and has been described in technical literature such as, for instance, "Nuclear Magnetic Resonance" by E. R. Andrew. Broadly, a specimen of the material concerned is immersed in a first unidirectional and homogenous magnetic field and in a second alternating magnetic field disposed to lie at right angles to such first field. At a particular alternation frequency of the alternating field which is related to the strength of the unidirectional field, power is absorbed from the alternating field and from this power absorption there may be readily derived an electrical signal which is indicative of the condition of resonance.

In most practical n.m.r. circuit arrangements provision is made for the periodic variation with time or scanning of either the alternation frequency of the alternating magnetic field or, more usually, the field strength of the unidirectional field in order to embrace the respective resonance conditions for a number of different materials and thereby to allow determination of the identity or character of the particular material sample under examination; when this is done the progressive increase of absorption followed by the similar progressive decrease of absorption as the aforesaid scanning variation sweeps through the particular resonance condition for the material sample results in the production of a resonance indicating output signal having the form of a bell-shaped pulse waveform.

It has already been established that, for any given apparatus, the area under such pulse is directly proportional to the number of nuclei involved in the resonance and measurement of such area can provide a considerable amount of useful information about the material. Thus in the above quoted example of tobacco leaf, if moisture is present in the leaf the hydrogen nuclei of such moisture can result in a resonance under certain conditions which are related to the amount of moisture present. The aforesaid area under the pulse-like resonance curve can be related to the physical condition of the leaf and hence to the likelihood or otherwise of spoilage when stored.

Unfortunately the derived signal is extremely small and rarely exceeds more than a few microvolts when referred to the coil winding which surrounds the material sample and which carries the alternating current for producing the alternating field. This necessitates the use of a large measure of amplification by electronic means in order to produce a signal of sufficient amplitude to operate display means such as an indicating meter or a cathode ray oscilloscope or recording means such as a pen or other recorder and the extent of amplification necessary is such that the actual noise component of the amplified signal waveform becomes significant and it is very difficult to provide arrangements whose gain is stable enough to allow a calibration which will remain accurate for more than a few minutes.

One object of the invention is to provide a method and arrangements which are substantially free from error due to the noise component of the amplified signals and/or to any amplifier drift and which may be made self-calibrating.

In accordance with this invention two or more material samples, one of which is a comparison standard of known characteristics, are each subjected to simultaneous or substantially simultaneous examination for nuclear magnetic resonance using a common amplifier for all or at least the major part of the necessary signal amplification and in a manner which permits identification of the respective signals derived from the different samples whereby that or those emanating from the sample of known characteristics may be used either as a standard for comparison with the signal or signals from the other sample or samples or as a gain control medium for the common amplifier means and thereby allow direct calibration of the meter or other indicating or display means responsive to the signal output or outputs derived from the other sample or samples.

Identification of the respective resonance signals from the different samples may be effected in any one of several ways including the use of different frequencies of scanning by variation of the alternating or steady magnetic fields and the final separation of the signals, after the major part of their amplification has been effected, by means of filters or further amplifiers tuned to the respective scanning frequencies or, more preferably, by the use of a common scanning waveform for either the alternating or steady magnetic fields of the n.m.r. detecting means in conjunction with different values of constant magnetic fields whereby the respective resonances occur at different time instants in each scan cycle and can accordingly be identified and, if necessary, separated on a timing basis.

In order that the nature of the invention may be more readily understood one particular embodiment thereof will now be described by way of illustrative example and with reference to the accompanying drawings in which:

FIG. 1 is a block schematic diagram of an arrangement in accordance with the invention.

FIG. 2 is a waveform diagram illustrating the general form of the bell-shaped output pulse which results from the setting up of nuclear resonance conditions within a material sample during the operation of the arrangement as shown in FIG. 1.

FIG. 3 comprises a series of representative waveform diagrams (a) . . . (f) applicable to the operation of the apparatus arrangement shown in FIG. 1.

FIG. 4 is a circuit diagram illustrating one form of the sweep generator portion of the arrangement shown in FIG. 1.

FIG. 5 is a circuit diagram illustrating one form of the nuclear magnetic resonance detector of the arrangement shown in FIG. 1.

Figure 6:
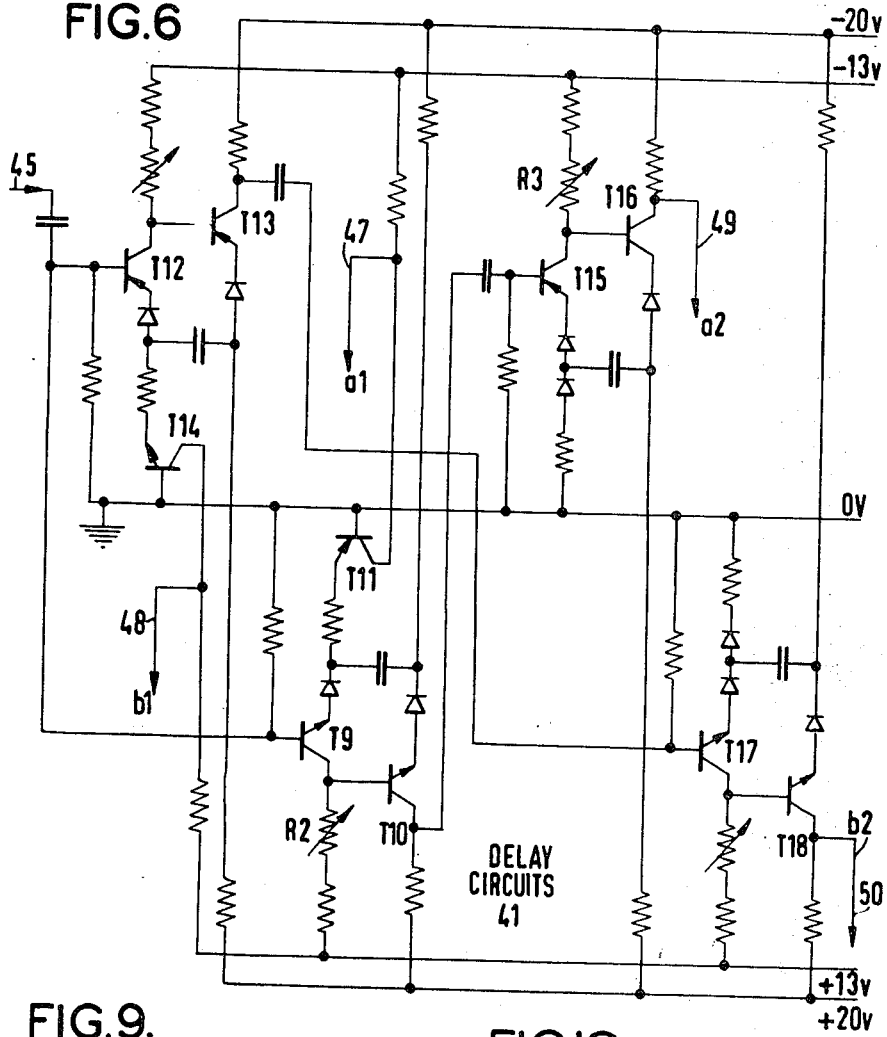

FIG. 6 is a circuit diagram illustrating one form of the delay circuit device of the arrangement shown in FIG. 1.

Figure 7:
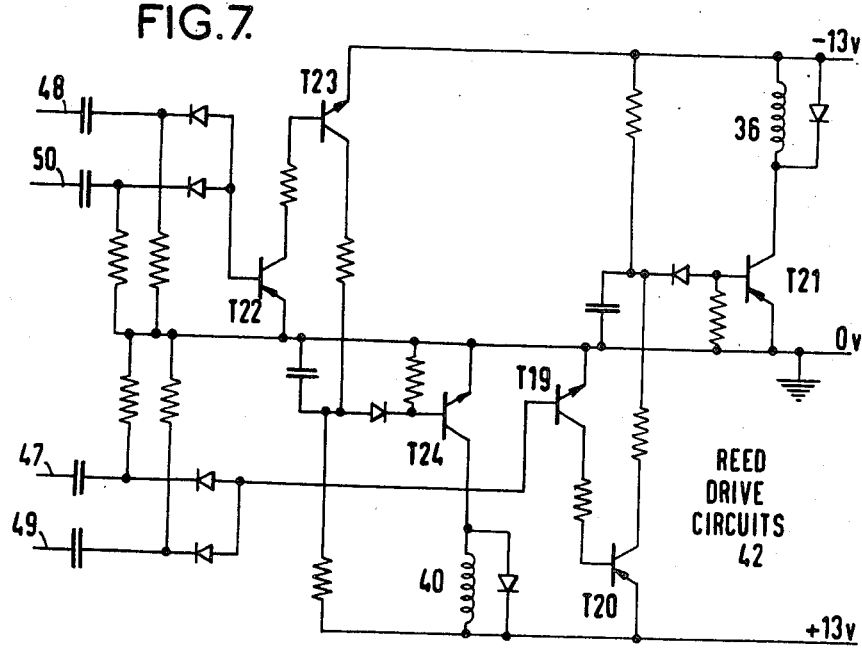

FIG. 7 is a circuit diagram illustrating one form of the relay or reed drive portion of the arrangement shown in FIG. 1.

Figure 8:
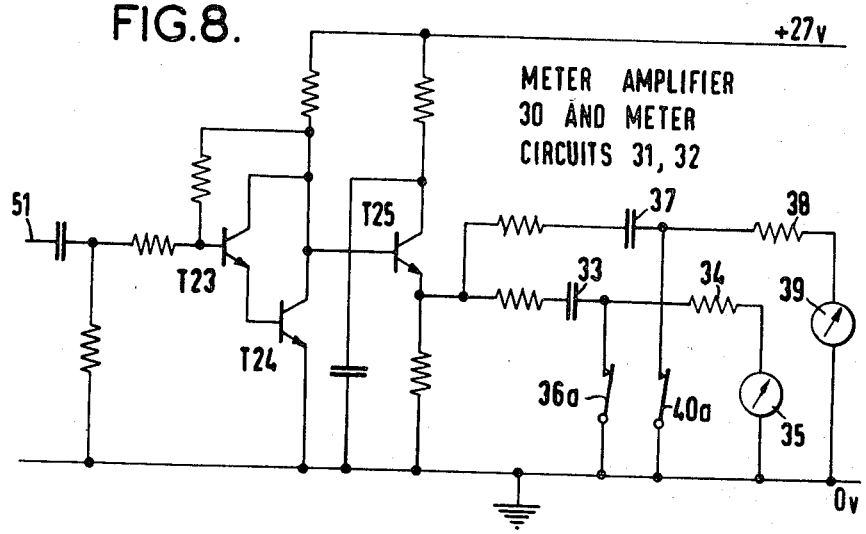

FIG. 8 is a circuit diagram illustrating the detailed form of the meter amplifier and meter circuit of the arrangement shown in FIG. 1.

Figure 9:
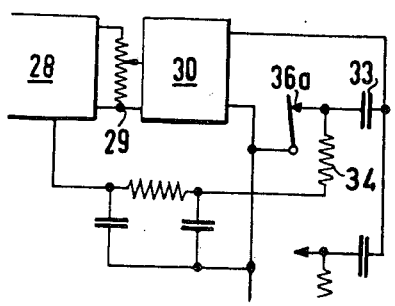
Figure 10:
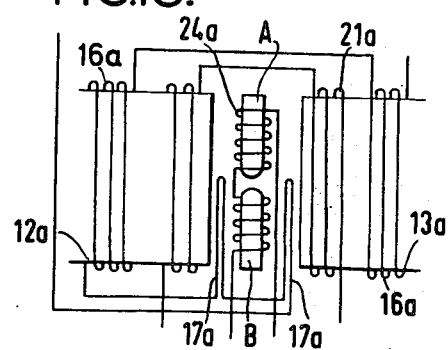

FIGS. 9 and 10 are fragmentary block schematic diagrams illustrating modifications of the arrangement shown in FIG. 1.

The arrangement shown in block schematic form in FIG. 1 comprises two magnet structures 10, 11 illustrated only by their opposing pole pieces 12, 13 and 14, 15 for providing two homogeneous unidirectional magnetic fields within which are immersed the respective material samples A and B. Pole pieces 12, 13 are surrounded by magnet windings 16 and pole pieces 14, 15 by similar windings 17 for energization by a suitable direct current source, shown symbolically as a battery 18. Variable series resistors 19, 20 in the supply leads to such windings permit independent adjustment of the field intensity provided by each of the windings.

The pole pieces 12, 13 are additionally embraced by scan coil windings 21 while pole pieces 14, 15 are likewise embraced by similar scan coil windings 22. These windings 21, 22 are connected in series for supply with a cyclically varying current, such as one having a sinusoidal or a triangular waveform, from a sweep generator 23 for cyclically varying the intensity of the unidirectional field to which the samples A and B are subjected.

Further coil windings 24, 25 surround the respective samples A and B and are connected, preferably in parallel as shown, to a self-oscillating nuclear magnetic resonance detector 26 whereby they are each supplied with a high-frequency oscillation in order to provide the high frequency magnetic field lying at right angles to the unidirectional magnetic field necessary for the establishment of nuclear magnetic resonance within the respective material samples A and B. Windings 24, 25 form part of the resonant tank circuit of the detector 26 while the parallel variable capacitor 27 allows adjustment of the oscillation frequency.

The derived resonance signals at the output of the detector 26 are fed to a first amplifier 28 having a high gain value and a proportion of the amplifier output, adjustable by means of potentiometer 29, is applied to a further meter amplifier 30. The output of the latter is fed to parallel meter circuits 31 and 32. The meter circuit 31 includes a feed capacitor 33 in series with a resistor 34 and indicating meter 35, the resistor 34 and meter 35 being shunted by normally-closed contacts 36a of a relay device whose operating coil is indicated at 36. The other meter circuit 32 is similar and comprises capacitor 37, resistor 38, meter 39 and normally-closed relay contacts 40a of a relay having an operating coil 40.

In addition to supplying the cyclically varying current to the scan coils 21, 22, the sweep generator 23 supplies a corresponding cyclically varying voltage waveform to a multiple delay circuit 41 which provides four separate pulse form output signals following the commencement of each sweep cycle of the output waveform from the generator 23. The respective delay periods for each of these pulses is independently adjustable. These pulse signals are fed to a reed drive circuit 42 to cause energisation of the relay coil 36 twice and energisation of the relay coil 40 twice during each cycle period of the sweep waveform.

In the operation of the arrangement just described, the cyclically varying current from the sweep generator 23 to the scan coils 21, 22, having a triangular waveform as shown in FIG. 3(a), causes the otherwise steady value of the unidirectional field caused by energisation of the windings 16, 17 to be increased and decreased regularly, once in each cycle period of the sweep waveform.

In the well known manner, at particular values of the unidirectional field related to the operating frequency of the high frequency oscillation supplied by the n.m.r. detector circuit 26 to the coil windings 24, 25, nuclear resonances occur within the material samples A and B. By suitable choice of the respective values of the two unidirectional fields, e.g. by adjustment of the variable resistors 19, 20, the resonances for the respective samples A and B are arranged to occur at different times during each sweep cycle, e.g. as shown at r1 and r4 and at r2 and r3 in FIG. 3(a) even when the respective samples are of the same basic material and hence would resonate at the same frequency/field strength value.

Each resonance results in an output signal from the detector 26 having the general form shown in FIG. 2. As already stated the area, shown hatched, under the pulse envelope line is directly proportional to the number of nuclei involved in the resonance and is the factor which requires to be measured. The signal waveform of the output from the detector 26 is accordingly, after amplification in amplifiers 28 and 30, as shown in FIG. 3(b) where the pulse signals A1 and A2 result from resonance within the material sample A and the pulse signals B1 and B2 result from resonance within the material sample B. With the large amount of amplification needed the zero or base line of the signal may carry quite a large noise component.

During each sweep cycle of the sweep generator 23, the variable delay circuits 41 and the reed drive circuits 42 operate to provide a pair of pulses as shown at a1 and a2 in FIG. 3(c) adjusted to be coincident in timing with the signal pulses A1, A2 and a further pair of pulses as shown at b1 and b2 in FIG. 3(d) adjusted to be coincident in timing with the signal pulses B1, B2. Such pulses are used to separate or gate out the respective A and B sample signals to separate meter circuits in a manner which also restores the respective signal outputs to a zero or earth level and which effectively reduces the active noise component to that which occurs during the gated-out pulse periods only.

This result is achieved by the energisation of the reed or relay coil 36, FIG. 1 by the pulses a1, a2, FIG. 3(c) whereby the contacts 36a, FIG. 1 are opened only during the time of such pulses and accordingly pass only the coincident signal pulses A1, A2 with that very small portion of the accompanying signal noise which occurs within the time of each control pulse to the A sample meter 35. Similarly, the reed or relay coil 40, FIG. 1 is energised by the pulses b1, b2, FIG. 3(d) to open the contacts 40a to pass only the coincident signal pulses B1, B2 to the sample meter 39.

Assuming the sample A is one of accurately known n.m.r. characteristic then, by adjusting the total amplifier gain by means of potentiometer 29, FIG. 1 to bring the reading on meter 35 to a given datum value, the corresponding value for the other sample B may be read off directly from the meter 39 if this has been calibrated to provide a measure of the corresponding characteristic e.g. moisture content.

One form of the sweep generator 23 is shown in FIG. 4 and comprises transistors T1, T2, T3, T4 arranged to form a saw-tooth relaxation oscillator. Output lead 44 supplies an associated power amplifier of any convenient and well known form for deriving a current waveform as shown in FIG. 3(a) while transistor T5 provides a similar control voltage waveform over lead 45 to the delay circuits 41 as shown in detail in FIG. 6.

The n.m.r. detector circuit 26 may be of any convenient and known form such as that due to Hopkins as described in the reference already quoted. One convenient form is shown in FIG. 5 where transistors T6, T7 are arranged as a unity-gain amplifier feeding a limiter including transistor T8 with positive feedback to maintain oscillation by way of resistor R1. The signal output on lead 46 is fed to the high gain amplifier 28 which may have any suitable known form.

The delay circuits 41 and the associated relay control pulse generating means of the drive circuits 42, FIG. 1, may take any suitable form such as a group of monostable trigger circuits including delayed triggering arrangements for providing the requisite series of short pulses at adjustable timing instants following the onset of each cycle period of the sweep waveform. An alternative and preferred circuit arrangement for the delay circuits 41 is shown in FIG. 6 where transistors T9, T10, T11 and their associated circuit components form a pulse generator providing an output pulse ($a1$) on lead 47 after a delay time from the onset of the triangular wave input on lead 45 determined by the adjusted value of resistor R2. Transistors T12, T13, T14 operate in similar manner to provide an output pulse ($b1$) on lead 48. Further transistors T15, T16 form a further pulse generator controlled by the first circuit of transistors T9, T10, T11 to provide an output pulse ($a2$) on lead 49 after a further delay time set by means of variable resistor R3. The circuit of transistors T17, T18 provide the corresponding further output pulse ($b2$) on lead 50.

Such pulses on leads 47–50 are fed to the drive circuits shown in FIG. 7 where transistors T19, T20, T21 develop from the pulses $a1$, $a2$, the requisite operating currents for the coil winding of the reed relay 36 and transistors T22, T23, T24 perform a similiar function with the pulses $b1$, $b2$ for the coil winding of the read relay 40.

FIG. 8 illustrates the meter amplifier 30 as including transistors T23, T24 and T25 arranged as a direct current amplifier of the output signals from the amplifier 28 and control potentiometer 29, FIG. 1, over lead 51 and supplying the meter circuits as already dealt with.

Various changes and modifications may clearly be made. Thus the use of the indicating meter 35 dealing with the standard or control sample A may be dispensed with and the output signal provided thereto used as an automatic gain control signal for the high gain amplifier 28 after suitable integration or smoothing as shown in FIG. 9.

Instead of employing separate magnet structures for the respective samples A and B, the two (or more) samples may be disposed in a common unidirectional magnetic field of suitable dimensions. Thus, as shown in FIG. 10, the samples A and B within a common high frequency winding 24a are located between the pole pieces 12a, 13a which are provided with main energising windings 16a and scanning coil windings 21a. A additional coil winding 17a in series with the main windings 16a provides an extra component of unidirectional field around the sample B.

Where separate magnets are employed these are conveniently of the form described in copending U.K. patent application No. 16741/64.

The improved stability provided by the isolation or chopping of the resonance signals through the timed operation of the relays 36, 40, may make the continuous employment of a standard sample, such as A, FIG. 1, unnecessary except for periodic calibration. In such circumstances, means may be provided for disconnecting the magnet system 10 with its windings 16, 21 and 24 and the related meter circuit 31.

I claim:

1. Apparatus for effecting examination and measurement of the condition or properties of a test material sample by the use of nuclear magnetic resonance phenomenon which comprises nuclear magnetic resonance detecting means having a first sensing coil arranged to surround said test material sample and a second sensing coil arranged to surround a second material sample of known nuclear magnetic resonance characteristics, said detecting means including means to induce oscillation in each such sensing coil to provide an alternating magnetic field, unidirectional field producing means adapted to subject said test material sample and associated first sensing coil to a homogeneous unidirectional magnetic field of a first intensity at right angles to the axis of the magnetic field generated by said first sensing coil and said second material sample and associated second sensing coil to a homogeneous unidirectional magnetic field of a second intensity differing from said first intensity of right angels to the axis of the magnetic field generated by said second sensing coil, scan means to cyclically vary the amplitude of both said homogeneous unidirectional magnetic fields, sweep means operative to provide a sweep signal to control the operation of said scan means, whereby a succession of resonance pulse signals from said samples occur in the associated sensing coil, the frequency of such resonance pulse signals in said first sensing coil differing from those in said second sensing coil even when said test and second material samples are identical, amplifier means connected to receive and amplify in like manner the resonance pulse signals from said first and second sensing coils, first and second output means connected to provide output signals from said amplifier means, metering means connected to receive output pulses from said first output means, variable delay means connetced to receive the sweep signal from said sweep means, said delay means being adjustable to operate upon receipt of said sweep signal to provide a plurality of gate pulse signals coincident in timing and substantially equal in duration to the resonance pulse signals from said sensing coils, and gating means connected for actuation by said gate pulse signals, said gating means operating upon receipt of a gate pulse to permit transmission of a coincident output pulse from said amplifier means by one of said output means.

2. The apparatus of claim 1 wherein said gating means includes first switching means connected to said first output means and said delay means to receive gate pulse signals coincident with resonance pulse signals from said first sensing coil and second switching means connected to said second output means and said delay means to receive gate pulse signals coincident with resonance pulse signals from said second sensing coil.

3. The apparatus of claim 2 wherein the gain of said amplifier means is adapted to be varied in response to an input control signal from said second output means, said first switching means being connected to control the provision of output signals from said amplifier means by said first output means to said metering means and said second switching means being connected to control the porvision of output signals from said amplifier means by said second output means as input control signals to vary the gain of said amplifier means.

4. The apparatus of claim 2 wherein a second metering means is connected to said second output means and said first and second switching means each include a relay switch connected to said delay means, said relay switch including a pair of relay-controlled contacts operative across the output of said amplifier means to short circuit the output signal to said first and second output means except when said relay switch receives gate pulse signals from said delay means, said first and second output means each including a feed capacitor connected in series with said relay controlled contacts and said metering means each including a resistance and measuring instrument in series with said feed capacitor across the output of said amplifier means, said relay controlled contacts shunting said resistance and measuring instrument.

References Cited

UNITED STATES PATENTS

| | | |
|---|---|---|
| 2,888,638 | 5/1959 | Nelson. |
| 2,999,974 | 9/1961 | Pinkley. |
| 3,039,047 | 6/1962 | Williams. |
| 3,109,138 | 10/1963 | Varian. |
| 3,197,692 | 7/1965 | Hyde _____ 324—0.5 |
| 3,287,629 | 11/1966 | Varian. |
| 3,348,136 | 10/1967 | Nelson. |
| 2,888,638 | 5/1959 | Nelson _____ 324—0.5 X |
| 3,039,047 | 6/1962 | Williams _____ 324—0.5 |
| 3,109,138 | 10/1963 | Varian _____ 324—0.5 |
| 3,287,629 | 11/1969 | Varian _____ 324—0.5 X |
| 3,348,136 | 10/1967 | Nelson _____ 324—0.5 X |

OTHER REFERENCES

A Nuclear Magnetic Resonance Moisture Meter in Proceeding of the National Electronics Conference, vol. 12, 1957, pp. 113–125, Rollwitz.

Proceedings of the National Electronics Conference, vol 12, April 1957, pp. 113–125 (Rollwitz).

R. V. ROLINEC, Primary Examiner

MICHAEL J. LYNCH, Assistant Examiner